United States Patent [19]

Kayahara

[11] Patent Number: 5,549,419
[45] Date of Patent: Aug. 27, 1996

[54] GROUTING LIQUID FOR INJECTION INTO A GROUND

[75] Inventor: Kenji Kayahara, Yokohama, Japan

[73] Assignee: Kyokado Engineering Co., Ltd., Tokyo, Japan

[21] Appl. No.: 326,500

[22] Filed: Oct. 20, 1994

[30] Foreign Application Priority Data

Oct. 20, 1993 [JP] Japan ................ 5-284180

[51] Int. Cl.$^6$ ................................ E02D 3/12
[52] U.S. Cl. ........................ 405/263; 106/624
[58] Field of Search .................. 405/263, 264; 106/606, 624, 636

[56] References Cited

U.S. PATENT DOCUMENTS

| | | | |
|---|---|---|---|
| 4,018,616 | 4/1977 | Sugahara | 106/624 X |
| 4,043,830 | 8/1977 | Suzuki | 405/263 X |
| 4,056,937 | 11/1977 | Suzuki | 405/264 |
| 4,226,556 | 10/1980 | Kayahara | 405/263 |
| 4,226,557 | 10/1980 | Kayahara | 405/263 X |
| 4,761,183 | 8/1988 | Clarke | 106/624 |
| 5,059,251 | 10/1991 | Gouvenot | 106/624 X |

FOREIGN PATENT DOCUMENTS

| | | | |
|---|---|---|---|
| 2758567 | 7/1979 | Germany | 106/606 |
| 35973 | 11/1970 | Japan | 405/263 |
| 55112 | 5/1976 | Japan | 405/263 |
| 78515 | 7/1976 | Japan | 405/263 |
| 55-012105 | 11/1980 | Japan . | |
| 86984 | 7/1981 | Japan | 405/263 |
| 05202513 | 8/1993 | Japan . | |
| 963236 | 7/1964 | United Kingdom . | |

OTHER PUBLICATIONS

"Basic properties and penetration of cement suspension grouts with different grain sizes" Yoneda et al. Doboku Gakkai Rombun–Hokokushu/Proceedings of Japan Society of Civil Engineers Mar. 1993, Abstract.

"Present and future use of coal ash in construction and related applications" Tyson, Utilization of Industrial By–Products for Construction Materials, ASCE, 1993 Abstract.

"Radiation stability of ground granulated blast furnace slag/ordinary portland cement grouts containing organic admixtures" Palmer et al. Materials Research Society Symposium Proceedings, vol. 294, 1993, Abstract.

"Ultrafine cement for oilwell cementing" Clarke et al. Rocky Mountain Regional Meeting/Low Permeability Reservoirs Symposium 1993, Abstract.

"Investigation of factors effected on the strength of solidifying filling mixture" Maletin et al. Fiziko–Tekhnicheskie Problemy Razrabotki Poleznykh Iskopaemykh No. 2, Mar.–Apr. 1992, Abstract.

"Ultrafine cement tests and dam test grouting" Clarke et al. Geotechnical Special Publication, ASCE, 1992 vol. 1, No. 30, Abstract.

"Proceedings of Annual Meeting of the Chinese Institute of Civil and Hydraulic Engineering", 1985, Anon, 1985, Abstract.

"Permanence of grouted sands exposed to various water chemistries" Siwula et al., Geotechnical Special Publication, vol. 2, No. 30, ASCE 1992, Abstract.

"Current chemical grout engineering in Japan" Yonekura et al., Geotechnical Special Publication, vol. 1, No. 30, ASCE, 1992, Abstract.

"Bonding strength of grouts and behavior of silicate grouted sand" Vipulanandan, et al. Geotechnical Special Publication, vol. 1, No. 30, ASCE, 1992, Abstract.

"Mechanical properties of microfine cement/sodium silicate grouted sand" Krizek et al. Geotechnical Special Publication, vol. 1, No. 30, 1992 Abstract.

"Properties of cement grouts and grouted sands with additives" Vipulanandan et al. Geotechnical Special Publication, vol. 1, No. 30, ASCE, 1992 Abstract.

"Development of a gas–liquid reaction injection system" Shimada et al., Geotechnical Special Publication, vol. 1, No. 30, ASCE, 1992, Abstract.

"Properties of low strength silicate/portland cement grouts" Domone, Cement and Concrete Research, vol. 20, No. 1, Jan. 1990, Abstract.

Primary Examiner—David J. Bagnell
Assistant Examiner—Frederick L. Lagman
Attorney, Agent, or Firm—Spencer & Frank

[57] ABSTRACT

A suspension-type grouting liquid for injection into a ground includes sodium aluminate having a mol ratio of 10 or more; and slag, wherein the mol ratio of sodium aluminate is defined as molar concentration of $Na_2O$/molar concentration of $Al_2O_3$. Preferably, the slag is fine grained and has a specific surface area of 8000 cm$^2$/g or more. The grouting liquid may further include at least one additional material selected from the group consisting of cement and dispersant. Preferably the cement is fine grained and has a specific surface area of 8000 cm$^2$/g or more. The grouting liquid shows high strength of consolidation in use in spite of having a low viscosity and a long gelation time, and shows a long duration of the strength of consolidation. Another embodiment of the grouting liquid includes water glass having a mol ratio of 2.5 or less; and slag, wherein the mol ratio of the water glass is defined as molar concentration of $SiO_2$/molar concentration of $Na_2O$, and wherein the slag is fine grained and has a specific surface area of 8000 cm$^2$/g or more. Yet another embodiment of the grouting liquid includes water glass; sodium aluminate; and slag, wherein the grouting liquid has a molar concentration of $SiO_2$ in the water glass/total molar concentration of $Na_2O$ in the water glass and sodium aluminate of 2.5 or less, and wherein the slag is fine grained and has a specific surface area of 8000 cm$^2$/g or more.

4 Claims, No Drawings

GROUTING LIQUID FOR INJECTION INTO A GROUND

BACKGROUND OF THE INVENTION

1. Field of the Invention

The present invention relates to a suspension-type grouting liquid for injection into a ground containing, as a main ingredient, slag or water glass or sodium aluminate in addition to the slag, or, if necessary, cement and/or dispersant in addition to said mixture, and particularly, to such a suspension-type grouting liquid for injection into a ground which shows high strength of consolidation in spite that it shows low viscosity and long gellation time, and moreover, which is excellent in long duration strength of consolidation.

2. Description of the Prior Art

A water glass-type suspension grout which is composed of adding cement into water glass, is well known in the past. In this case, if the grout is adjusted to a long gellation time for improving the penetrative property, the strength of consolidation lowered, and moreover, long duration strength of consolidation is, also lacked.

Then, the grout of cement-water glass having low mol ratio is newly proposed, which is possible to be adjusted to a long gellation time.

But, it also shows the gellation time of merely several minutes to ten minutes, and thus, the penetrative property thereof is not satisfied. Moreover, in this case, the cement and water glass can not be satisfactorily mixed, and thus, the reaction between them is not completely accomplished, and as a result thereof, the long stabilization of the consolidated material can not be obtained in the ground.

Accordingly, it is an object of the present invention to provide a grouting liquid for injection into a ground, which shows high strength of consolidation in spite of having a long gellation time and low viscosity, and which is excellent in penetration property and in long duration strength of consolidation, and moreover, which overcomes disadvantages associated with the above-described prior art.

SUMMARY OF THE INVENTION

To achieve the above object, according to the present invention, there is provided a grouting liquid for injection into a ground which comprises water glass having mol ratio of 2.5 or less and slag, or sodium aluminate having mol ratio of 10 or more and slag, or, moreover, water glass, sodium aluminate and slag, or if necessary, cement and/or dispersant in addition to each of said mixtures.

DESCRIPTION OF THE PREFERRED EMBODIMENTS

The present invention will be described by way of preferred embodiments.

The present grouting liquid comprises slag as a main ingredient, and is composed of the following conditions.

1. A grouting liquid for injection into a ground which comprises slag and water glass having mol ratio of 2.5 or less, in which the mol ratio of the water glass indicates the value of molar concentration of $SiO_2$/molar concentration of $Na_2O$ in water glass.
2. A grouting liquid for injection into a ground which comprises slag and sodium aluminate having mol ratio of 10 or more, in which the mol ratio of sodium aluminate represents the value of molar concentration of $Na_2O$/molar concentration of $Al_2O_3$ in the liquid of sodium aluminate.
3. A grouting liquid for injection into a ground which comprises slag, water glass, and sodium aluminate, in which the value of molar concentration of $SiO_2$ in water glass/molar concentration of total $Na_2O$ in water glass and sodium aluminate shows 2.5 or less.
4. A grouting liquid for injection into a ground which comprises, if necessary, cement and/or dispersant in addition to each of said mixtures 1, 2 and 3.
5. A grouting liquid for injection into a ground, wherein said slag or cement used in said 1, 2, 3 and 4 is fine grain slag or fine grain cement having, respectively, specific surface area of preferably 8000 $cm^2$/g or more.

The amounts of said water glass, slag or sodium aluminate to be used are respectively variable, and thus, it is very difficult to determine the amounts, but the rough amounts are determined as follows.

1. Water glass

The amount of water glass to be used is, as molar concentration, 0.3 to 4.0 mol, preferably 0.4 to 2.0 mol of $SiO_2$ in 1000 g of the total blending amounts.

2. Slag

The amount of slag to be used is 100 to 500 g, preferably 200 to 400 g in 1000g of total blending amounts.

3. Sodium aluminate

The sodium aluminate is generally used as a liquid state. The amount thereof to be used is, as molar ratio, 0.002 to 0.1 mol, preferably, 0.0025 to 0.08 mol of $Al_2O_3$ in 1000 g of total blending amounts.

When each of said amounts is out of said range, the viscosity of the obtained liquid becomes high, and as a result, the penetrative property becomes inferior, or the gellation time of the liquid becomes short, or abnormally long, and as a result, it can not be completely consolidated to show semi-consolidation state, and accordingly, the strength of the consolidated material becomes weak.

The functions of the present invention are considered as follows.

In the past, the grout of cement-water glass having low mol ratio is known, which is possible of prolonging the gellation time. But, the gellation time is merely in the range of several minutes to ten minutes.

The reason is considered that the amount of CaO in the cement is larger than the amount of $SiO_2$ in the water glass, and thus, the $SiO_2$ becomes easily reactive with the alkali.

On the other hand, however, in the present invention, the amount of CaO in slag is smaller than the amount of the cement, and thus, the reaction of $SiO_2$ with the alkali is comparatively slow. And accordingly, it is considered that the present liquid is gradually consolidated with a long gellation time, and shows high consolidation strength.

In addition, if the cement is added into said present liquid, the self curability resided in the cement is introduced in the present liquid.

Moreover, in the present invention, small amounts of the precipitation will be rarely appeared according to the blending ratio. To prevent the precipitation, the dispersant is used in the present invention to obtain a uniformly consolidated material.

EXAMPLES

The present invention will now be described in more detail by way of examples, but is not limited by these examples.

1. Material used
 (1) Slag

The blast furnace slag (Trade name: ESMENT), which is commercially sold, and the ground slag having the specific surface area shown in Table 1, were used.

TABLE 1

| slag | specific surface area(cm$^2$/g) |
|------|-------------------------------|
| (1)  | 3100 (not grinding)           |
| (2)  | 5500                          |
| (3)  | 8100                          |
| (4)  | 11300                         |

(2) Sodium aluminate 3 kinds of sodium aluminate shown in Table 2 were used in these examples. (In the present invention, the potassium aluminate also shows the same result as the sodium aluminate.)

TABLE 2

| liquid of sodium aluminate | density (20° C.) | Al$_2$O$_3$ (%) | Na$_2$O (%) | mol ratio |
|---|---|---|---|---|
| (1) | 1.24 | 4.00 | 14.00 | 5.27 |
| (2) | 1.30 | 3.60 | 22.00 | 10.05 |
| (3) | 1.33 | 1.59 | 22.47 | 23.25 |

(3) Water glass

The water glasses shown in Table 3 were respectively used.

TABLE 3

| water glass | density (20° C.) | Na$_2$O (%) | SiO$_2$ (%) | mol ratio |
|---|---|---|---|---|
| (1) | 1.40 | 9.32 | 28.75 | 3.18 |
| (2) | 1.62 | 14.4 | 34.7  | 2.49 |
| (3) | 1.74 | 18.7 | 35.6  | 1.97 |
| (4) | 1.59 | 20.0 | 28.1  | 1.45 |

(4) Cement

The most popular portland cement with fine grain, having 8500 cm$^2$/g of specific surface area, was used in the examples, although various kinds of cements, such as alumina cement, portland cement, slag cement etc., can be used.

(5) Dispersant

Trade name: MAITY 150 was used.

2. Blending and results
 (1) Water glass-slag type

The blending, gellation time, funnel viscosity, and unconfined compressive strength of the consolidated grout which is impregnated in water of the water glass-slag type were shown in Table 4.

TABLE 4

| example No. | blending | | | | | | | | | funnel viscosity after 10 min. (sec.) | gelation time (min.) | impregnation in water unconfined compressive strength (kgf/cm$^2$) | |
|---|---|---|---|---|---|---|---|---|---|---|---|---|---|
| | water glass No. in Table 3 (g) | | | | slag No. in Table 1 (g) | | | | water (g) | | | 7 days | 30 days |
| | (1) | (2) | (3) | (4) | (1) | (2) | (3) | (4) | | | | | |
| 1  | 170 | —   | —   | —   | 270 | —   | —   | —   | 560 | gelation | 2   | 5.6  | 6.9  |
| 2  | 170 | —   | —   | —   | —   | —   | —   | 270 | 560 | gelation | 1.3 | 6.2  | 7.4  |
| 3  | —   | 170 | —   | —   | 270 | —   | —   | —   | 560 | 45       | 30  | 29.8 | 32.7 |
| 4  | —   | 170 | —   | —   | —   | 270 | —   | —   | 560 | 41       | 27  | 31.0 | 33.1 |
| 5  | —   | 170 | —   | —   | —   | —   | 270 | —   | 560 | 34       | 25  | 35.1 | 38.0 |
| 6  | —   | 170 | —   | —   | —   | —   | —   | 270 | 560 | 30       | 22  | 37.4 | 40.7 |
| 7  | —   | —   | 170 | —   | 270 | —   | —   | —   | 560 | 32       | 60  | 33.5 | 36.0 |
| 8  | —   | —   | 170 | —   | —   | —   | 270 | —   | 560 | 26       | 48  | 39.7 | 42.0 |
| 9  | —   | —   | —   | 170 | 270 | —   | —   | —   | 560 | 30       | 77  | 37.0 | 39.0 |
| 10 | —   | —   | —   | 170 | —   | 270 | —   | —   | 560 | 21       | 70  | 38.6 | 41.5 |
| 11 | —   | —   | —   | 170 | —   | —   | 270 | —   | 560 | 27       | 66  | 41.2 | 44.8 |
| 12 | —   | —   | —   | 170 | —   | —   | —   | 270 | 560 | 20       | 61  | 41.7 | 45.1 |

(Temp. 20 ± 1° C.)

In examples 1 and 2 shown in Table 4, No. 3 water glass, having 3.18 of mol ratio, were used, respectively. It can be understood from Table 4 that the strength of the consolidated grout is not increased in spite that the gellation time is short.

In examples 3 to 12 shown in Table 4, the water glass having low mol ratio of the present invention are used, respectively.

It can be understood from Table 4 that when the mol ratio becomes 2.5 or less, the viscosity is suddenly lowered, and the strength of the consolidated grout is high in spite that the gellation time is long.

Moreover, it can be understood from Table 4 that the gellation time of the grout becomes a little shorter, and the strength of the grout becomes extremely higher, when the particle size of the slag becomes smaller, especially, the specific surface area of the slag becomes 8000 $cm^2/g$ or more.

(2) Sodium aluminate-slag type

The blending, gellation time, funnel viscosity, and unconfined compressive strength of the consolidated grout which is impregnated in water of the sodium aluminate-slag type were shown in Table 5.

It can be understood from these examples of Table 5 that the strength of the consolidated grout shows 20 $Kgf/cm^2$ or less at the most, in spite that the gellation time is comparatively short, showing 1 to 2 hours, and the funnel viscosity is high, showing 1 minute or more.

In examples 15 to 22, sodium aluminate of the present invention were used, respectively.

It can be understood from these examples of Table 5 that when the mol ratio becomes 10 or more, the strength of the consolidated grout is extremely high in spite that the gellation time becomes longer and viscosity is lowered.

Moreover, it can be understood from examples 17, 18, 21, and 22 of Table 5 that the gellation time of becomes a little shorter and the viscosity thereof is lowered, and further, the strength thereof becomes extremely higher, when the particle size of the slag becomes smaller, especially, the specific surface area of the slag becomes 8000 $cm^2/g$ or more.

(3) Water glass-sodium aluminate-slag type

The blending, gellation time, funnel viscosity, and unconfined compressive strength of the consolidated grout which is impregnated in water of the water glass-sodium aluminate-slag type were shown in Table 6.

TABLE 5

| example No. | blending | | | | | | | water (g) | funnel viscosity after 10 min. (sec.) | gellation time (hour) | impregnation in water unconfined compressive strength (kgf/cm$^2$) | |
|---|---|---|---|---|---|---|---|---|---|---|---|---|
| | sodium aluminate No. in Table 2 (g) | | | slag No. in Table 1 (g) | | | | | | | | |
| | (1) | (2) | (3) | (1) | (2) | (3) | (4) | | | | 7 days | 30 days |
| 13 | 140 | — | — | 370 | — | — | — | 490 | 100 | 1.5 | 10.1 | 16.5 |
| 14 | 140 | — | — | — | — | — | 370 | 490 | 80 | 1.2 | 13.2 | 19.9 |
| 15 | — | 140 | — | 370 | — | — | — | 490 | 43 | 7 | 21.5 | 24.1 |
| 16 | — | 140 | — | — | 370 | — | — | 490 | 39 | 6 | 23.2 | 26.6 |
| 17 | — | 140 | — | — | — | 370 | — | 490 | 33 | 4 | 26.3 | 29.5 |
| 18 | — | 140 | — | — | — | — | 370 | 490 | 30 | 3 | 28.0 | 31.8 |
| 19 | — | — | 140 | 370 | — | — | — | 490 | 29 | 9 | 27.7 | 32.0 |
| 20 | — | — | 140 | — | 370 | — | — | 490 | 26 | 8 | 30.1 | 34.9 |
| 21 | — | — | 140 | — | — | 370 | — | 490 | 21 | 7 | 38.8 | 43.0 |
| 22 | — | — | 140 | — | — | — | 370 | 490 | 18 | 6 | 40.4 | 45.7 |

(Temp. 20 ± 1° C.)

In examples 13 and 14, sodium aluminate having 5.87 of mol ratio, and containing small amounts of alkali were used, respectively.

TABLE 6

| example No. | blending | | | | | | water (g) | molar concentration rate [SiO$_2$]/[Na$_2$O] | funnel viscosity after 10 min. (sec.) | gellation time (min.) | impregnation in water unconfined compressive strength (kgf/cm$^2$) | |
|---|---|---|---|---|---|---|---|---|---|---|---|---|
| | water glass No. in Table 3 (g) | | sodium aluminate No. in Table 2 (g) | | slag No. in Table 1 (g) | | | | | | | |
| | (1) | (2) | (1) | (2) | (1) | (3) | | | | | 7 days | 30 days |
| 23 | 145 | — | 21 | — | 285 | — | 549 | 2.62 | 76 | 17 | 8.1 | 10.9 |
| 24 | 136 | — | 28 | — | 290 | — | 546 | 2.43 | 40 | 43 | 23.8 | 30.5 |
| 25 | 102 | — | 56 | — | 310 | — | 232 | 1.75 | 42 | 60 | 28.7 | 36.0 |
| 26 | 102 | — | 56 | — | — | 310 | 232 | 1.75 | 32 | 50 | 29.7 | 40.0 |
| 27 | — | 145 | — | 21 | 285 | — | 549 | 2.04 | 38 | 70 | 26.9 | 35.4 |
| 28 | — | 145 | — | 21 | — | 285 | 549 | 2.04 | 30 | 55 | 28.0 | 38.8 |

(Temp. 20 ± 1° C.)

It can be said from Tables 4 and 5 that the examples 1, 2, 13 and 14, in which water glass having high mol ratio (mol ratio: 3.18), or sodium aluminate having low mol ratio (mol ratio: 5.87) are separately mixed with slag, respectively show unpreferable results. On the other hand, it can be said from Tables 4 and 5 the when the water glass having low mol ratio, or sodium aluminate having high mol ratio are used in the examples, each of them shows preferable results concerning viscosity, gellation time, and strength, respectively.

It can be said from examples 27 and 28 on Table 6 that when both of the water glass having low mol ratio of 2.49 and sodium aluminate having high mol ratio of 10.05 are mixed with slag in combination, the obtained examples 27 and 28 show preferable results, respectively.

But, concerning examples 23 to 26, which are respectively prepared by mixing the both of water glass having high mol ratio (mol ratio: 3.18, No. 3 water glass) and sodium aluminate having low mol ratio (mol ratio: 5.87) with slag, examples 24 to 26 show preferable results except example 23. Thus, it is understood from Table 6 that when water glass having high mol ratio and sodium aluminate having low mol ratio are mixed with slag in combination, the obtained samples show preferable results in the case the the ratio of the molar concentration of $SiO_2$ water glass to the molar concentration of total $Na_2O$ in water glass and sodium aluminate is 2.5 or less (examples 25, 26), and show unpreferable results in the case that said ratio is more then 2.5 (example 23).

As a conclusion, it is said from Table 6 that when water glass having high mol ratio and sodium aluminate having low mol ratio, both of which are commercially sold, are mixed with slag to obtain the present liquid, the obtained samples show preferable results, if they are satisfied with the above conditions.

In Table 6, the non-grinding slag having specific surface area 3100cm$_2$/g of and the finely ground slag having specific surface area of 8100 cm$^2$/g were used as a slag. It is said from Table 6 that examples 26 and 28, both, using finely ground slag show lower viscosity and higher strength though the gellation time is a little short, compared with examples 25, and 27.

(4) Use of cement and dispersant

Example 17 of Table 5 and example 26 of Table 6 were used as the examples. In these examples, a part of slag was substituted by cement, and moreover, the dispersant was added thereinto to obtain new examples. The test was carreid out by using these new examples. The results were shown on Table 7.

It is shown on table 7 that when a part of slag is substituted by cement as mentioned above, the viscosity becomes a little higher, gellation time becomes a little longer, and the strength is a little lowered. Accordingly, it is understood from the facts that when the grout having a long gellation time is wanted, this sample is effective. The dispersant acts to prevent the precipitation of ingredients when the grout has a long gellation time. Thus, the grout is usually kept in homogeneous, suspension, and as a result, the strength of the consolidated grout is increased.

The effcts of the present grouting liquid for injection into the a ground are as follows.

1. A mixture of slag and water glass having mol ratio of 2.5 or less, and a mixture of slag and sodium aluminate having mol ratio of 10 or more, respectively, can be gelled with a long gellation time, keeping low viscosity, and thus, they are very excellent in penetration property as suspension-type grouts. Also, they show very high strength of consolidation spite that they have such a long gellation time, and thus, they are expected as a suspension type grout excellent in endurance.

TABLE 7

| example No. | blending | | | | | | funnel viscosity after 10 min. (sec.) | gellation time (hour) | impregnation in water unconfined compressive strength (kgf/cm$^2$) | |
|---|---|---|---|---|---|---|---|---|---|---|
| | water glass No. in Table 3 (g) | sodium aluminate No. in Table 2 (g) | slag No. in Table 1 (g) | cement (g) | dispersant (g) | water (g) | | | 7 days | 30 days |
| 29 | — | (2) 140 | (3) 300 | 70 | — | 490 | 38 | 4.5 | 24.6 | 27.5 |
| 30 | — | 140 | 300 | 70 | 10 | 480 | 41 | 4.2 | 25.2 | 29.0 |
| 31 | (1) 102 | (1) 56 | (3) 250 | 60 | — | 532 | 39 | 1.3 | 27.5 | 36.0 |
| 32 | 102 | 56 | 250 | 60 | 10 | 522 | 44 | 1.1 | 28.3 | 39.1 |

(Temp. 20 ± 1° C.)

2. In a mixture of slag and sodium aluminate, the water glass is not necessary to show mol ratio of 2.5 or less, and sodium aluminate is not necessary to show mol ratio of 10 or more. If the ratio of molar concentration of $SiO_2$ in water glass and molar concentration of $Na_2O$ in the mixture of water glass and sodium aluminate is 2.5 or less, the mixture shows excellent effects same as afore-mentioned No. 1. Accordingly, in this mixture, JIS No. 3 water glass and sodium aluminate having low mol ratio, which are commercially sold, can be used.

3. In the mixtures of said No. 1 and 2, the gellation time can be prolonged by substituting a part of slag with cement.

4. In the mixtures of said No. 1, 2 and 3, the precipitation does not appear by adding dispersant thereinto, even though they have a long gellation time. Thus, the homogeneous and strong consolidation grout is obtained from the mixture.

5. The slag and cement to he used are preferably fine grained. The obtained mixtures show low viscosity and high strength of consolidation. Especially, this effect is excellent when they have the specific surface area of 8000 $cm^2/g$ or more.

What is claimed is:

1. A suspension-type grouting liquid for injection into a ground, comprising:

sodium aluminate having a mol ratio of 10 or more; and slag, wherein the mol ratio of sodium aluminate is defined as molar concentration of $Na_2O$/molar concentration of $Al_2O_3$.

2. The grouting liquid as claimed in claim 1, further comprising at least one additional material selected from the group consisting of cement and dispersant.

3. The grouting liquid as claimed in claim 1, wherein said slag is fine grained and has a specific surface area of 8000 $cm^2/g$ or more.

4. The grouting liquid as claimed in claim 2, wherein said cement is fine grained and has a specific surface area of 8000 $cm^2/g$ or more.

* * * * *